(12) United States Patent
Suddarth

(10) Patent No.: US 8,087,623 B2
(45) Date of Patent: Jan. 3, 2012

(54) VERTICAL DISPLAY MOUNTING DEVICE

(76) Inventor: Wesley Allison Suddarth, Lebanon, TN (US)

( * ) Notice: Subject to any disclaimer, the term of this patent is extended or adjusted under 35 U.S.C. 154(b) by 289 days.

(21) Appl. No.: 12/563,925

(22) Filed: Sep. 21, 2009

(65) Prior Publication Data
US 2011/0068241 A1 Mar. 24, 2011

(51) Int. Cl.
A47F 5/00 (2006.01)
E04G 25/00 (2006.01)
(52) U.S. Cl. .................. 248/122.1; 248/200.1; 248/235
(58) Field of Classification Search ............... 248/122.1, 248/200.1, 644, 159, 235
See application file for complete search history.

(56) References Cited

U.S. PATENT DOCUMENTS

| 4,638,969 | A | 1/1987 | Brown | |
|---|---|---|---|---|
| 4,684,089 | A | 8/1987 | van der Lely | |
| 4,733,838 | A | 3/1988 | van der Lely | |
| 5,275,364 | A * | 1/1994 | Burger et al. | 248/125.1 |
| 5,751,548 | A | 5/1998 | Hall et al. | |
| 5,859,762 | A | 1/1999 | Clark et al. | |
| 5,906,284 | A * | 5/1999 | Hammerstrom et al. | 211/205 |
| 5,941,488 | A | 8/1999 | Rosen | |
| 6,168,126 | B1 | 1/2001 | Stafford | |
| 7,219,940 | B2 | 5/2007 | Huang | |
| 2002/0190171 | A1 | 12/2002 | Stock | |
| 2008/0054145 | A1 | 3/2008 | Lipman et al. | |

* cited by examiner

Primary Examiner — Anita M King
(74) Attorney, Agent, or Firm — James Addison Barry, Jr.

(57) ABSTRACT

The vertical display mounting device 100 comprises a vertical mounting attachment member 200 and at least one display mount 300 wherein the vertical mounting attachment member 200 may be the combination of a vehicle attachment member 400 and a vertical mounting member 500. The vertical display mounting device 100 may further include brackets 600 for attaching the vehicle attachment member 400 with the vehicle cab attachment points 14, 16 when the vehicle attachment member aperture 414, 416 and the vehicle cab 12 attachment points 14, 16 are not in alignment; an electrical mount 800; and a kit embodiment.

8 Claims, 8 Drawing Sheets

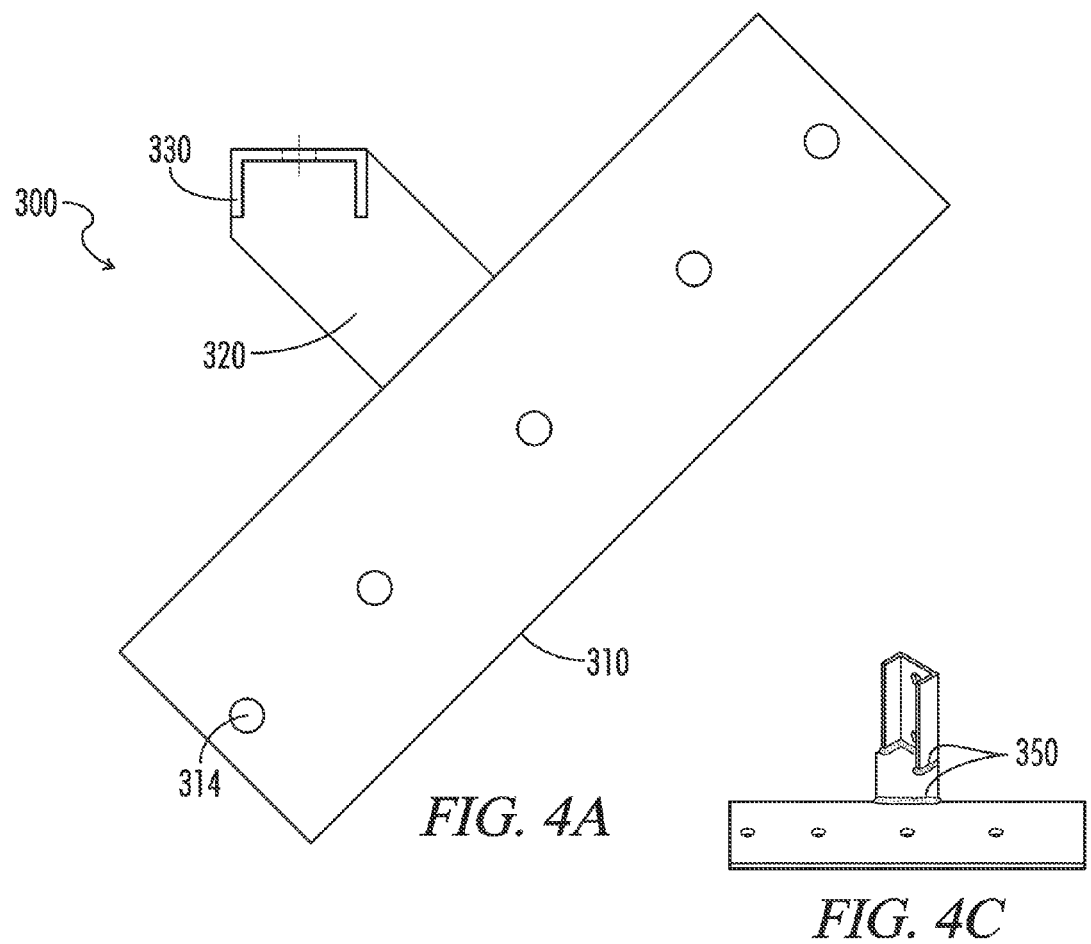
*FIG. 4A*
*FIG. 4C*
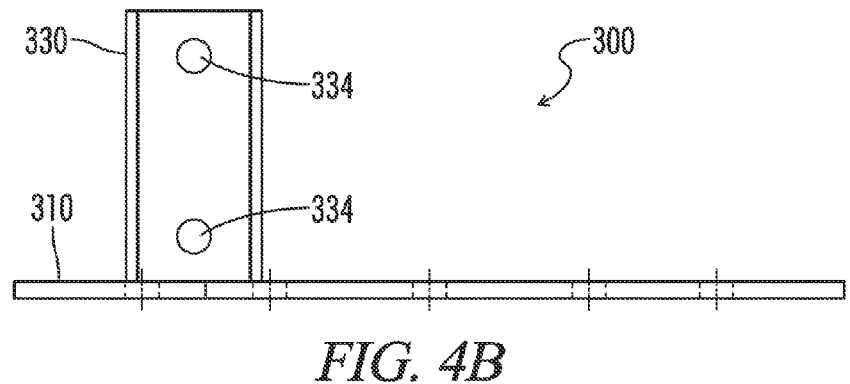
*FIG. 4B*

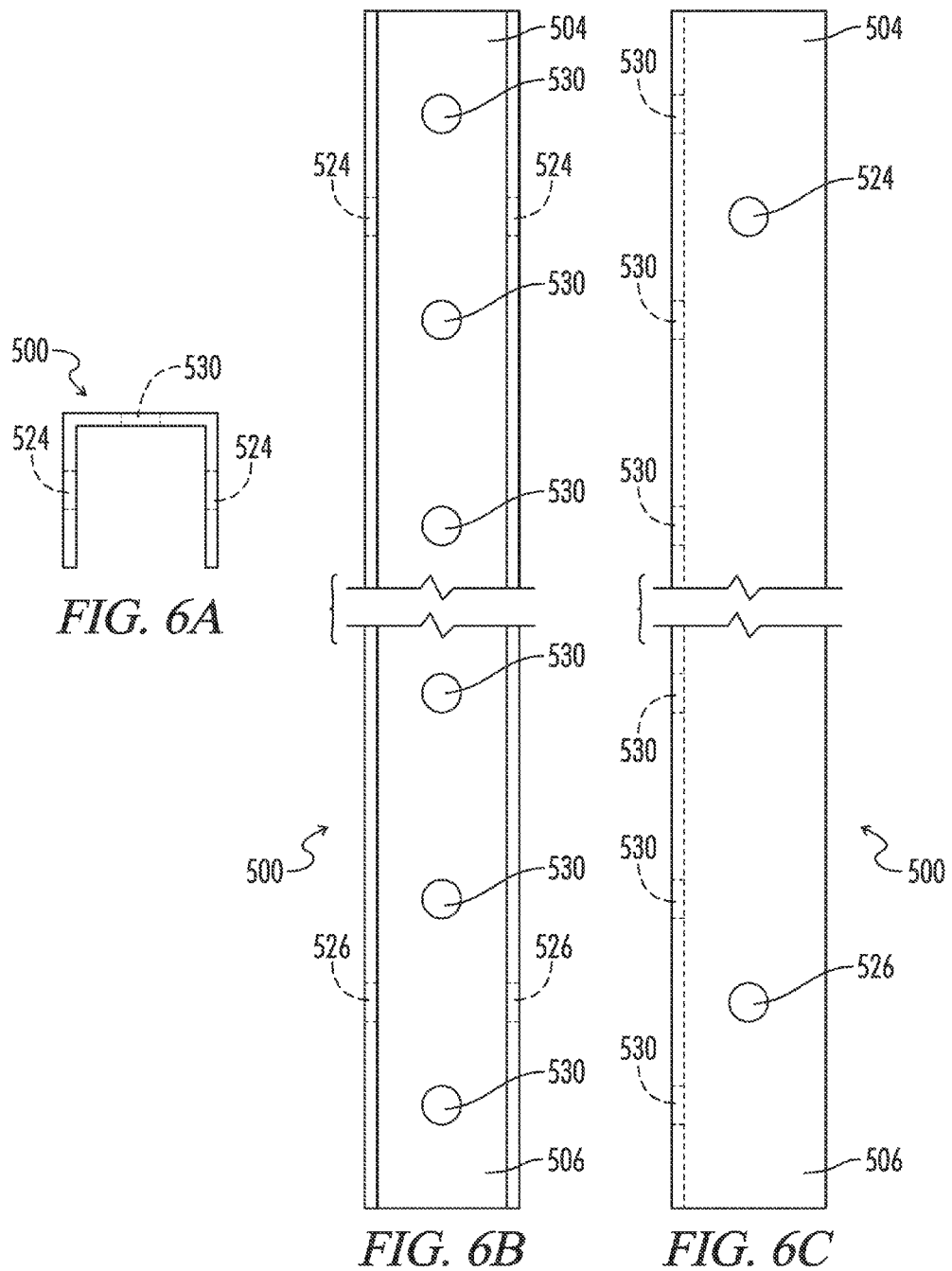

VERTICAL DISPLAY MOUNTING DEVICE

FIELD OF INVENTION

The present invention relates to mounting displays within the cab of vehicles. More specifically, a vertical display mounting device is a structure that mounts with the vehicle cab such that a display or monitor may be attached.

BACKGROUND OF INVENTION

With the advent of an increase in technology usage with agriculture and vehicles, there is a demand for a simple, strong, stable mounting device for vehicles including tractors. Several supports, stands, and display arrangements have been proposed for mounting monitors, displays and computers in vehicles. However, most are complex and do not offer a strong, stable platform for monitors and displays. U.S. Pat. No. 4,638,969 to Brown; U.S. Pat. Nos. 4,684,089 and 4,733,838 to van der Lely; U.S. Pat. No. 5,751,548 to Hall et al.; U.S. Pat. No. 5,859,762 to Clark et al.; U.S. Pat. No. 5,941,488 to Rosen; and U.S. Pat. No. 6,168,126 to Stafford are examples of mounts for computer equipment, monitor, and displays that are mounted with the floor and may exhibit a stability, strength, and security problem especially with a moving vehicle over rough terrain. U.S. Pat. No. 7,219,940 to Huang and U.S. Application No. 2002/0190171 to Stock are examples of wall or dashboard mounts that are designed for light weight quick connect and quick disconnect portability. U.S. Application No. 2008/0054145 to Lipman et al. is an example of a complex console mounting arrangement.

There is a need for a simple, strong, stable mounting device for organizing and conveniently mounting monitors and displays that enables the operator to conveniently view and reach the monitors and displays while operating the vehicle.

SUMMARY

The present invention provides a simple, strong, stable mounting device with the ability to organize and conveniently and securely mount monitors and displays such that the operator is able to conveniently view and reach the monitors and displays while operating the vehicle. The vertical display mounting device addresses these and other needs by providing an easy to manufacture, inexpensive vertical display mounting device that may attach the upper and lower portions of the vertical display mounting device with preexisting threaded holes in the vehicle cab for strength and stability and wherein the vertical display mounting device includes at least one display mount that may extend at an angle from the vertical display mounting device in a mounted position thus allowing convenient viewing and when necessary the monitor, display or electronic equipment is within reach of the operator of the vehicle.

One embodiment of the vertical display mounting device comprises a vertical mounting attachment member including an upper portion of the vertical mounting attachment member attachable with a vehicle cab upper attachment point and including a lower portion of the vertical mounting attachment member attachable with a vehicle cab lower attachment point; and at least one display mount wherein the at least one display mount is attachable with a display and the at least one display mount is attachable with the vertical mounting attachment member.

Another embodiment of the vertical display mounting device may comprise a vehicle attachment member, a vertical mounting member, and at least one display mount wherein upper and lower portions of the vehicle attachment member are attachable with the upper attachment point in a vehicle cab and the lower attachment point in the vehicle cab. The at least one display mount includes an angled connector included between a base and a display brace for positioning a display in the vehicle cab at a conveniently position for an operator.

There are a number of other embodiments and detailed descriptions of these embodiments disclosed herein that provide a simple, strong, stable, and convenient mounting of displays and monitors for vehicles and especially those vehicles such as farm tractors that have limited room for extra equipment in the vehicle cab and wherein the vehicles are required to operate in rugged environments.

BRIEF DESCRIPTION OF THE DRAWINGS

These and other features, aspects, and advantages of the invention will become better understood with regard to the following description, appended claims, and accompanying drawings where:

FIG. 4A depicts a top view of one embodiment of the vertical display mounting device display mount;

FIG. 4B is a front view of one embodiment of the vertical display mounting device display mount;

FIG. 4C is a perspective view of another embodiment of the vertical display mounting device display mount;

FIG. 6A is a top view of one embodiment of the vertical display mounting device vertical mounting member;

FIG. 6B is a front view of one embodiment of the vertical display mounting device vertical mounting member;

FIG. 6C is a side view of one embodiment of the vertical display mounting device vertical mounting member;

DETAILED DESCRIPTION OF THE INVENTION

The present invention relates to the field of mounting displays within the cab of vehicles. More specifically, a vertical display mounting device is a vertical structure wherein an upper portion of the vertical structure mounts with a vehicle cab upper pre-existing aperture and a lower portion of the vertical structure mounts with the vehicle cab lower pre-existing aperture securely such that a display or monitor may be attached with an angled display mount that is attached with the vertical structure and the display or monitor is easily viewed or operated with securely mounted displays. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

OVERVIEW OF THE INVENTION

Figure 1:
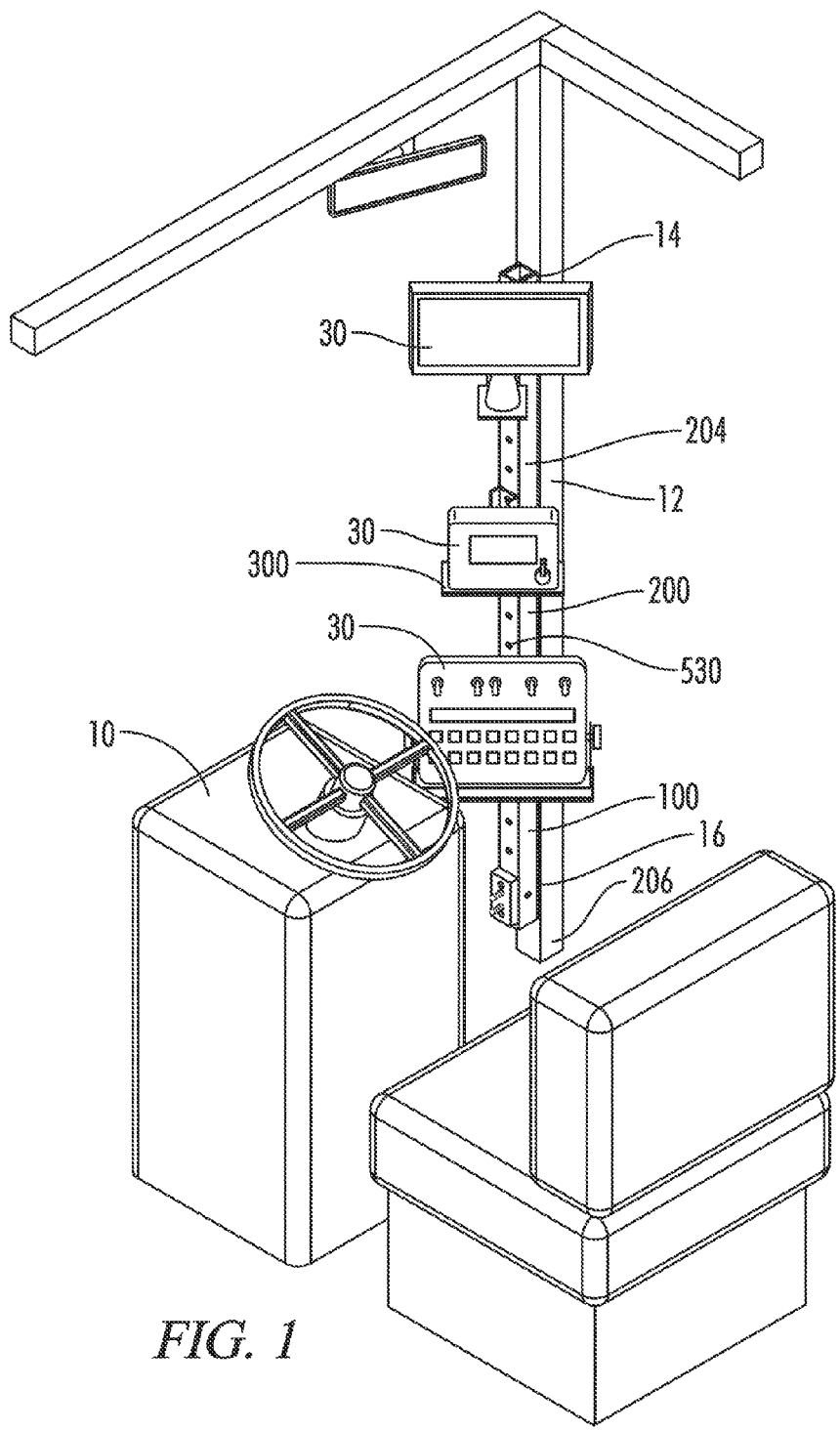
FIG. 1 is a perspective view of one embodiment of the vertical display mounting device depicting the embodiment in combination with a vehicle.
Figure 2:
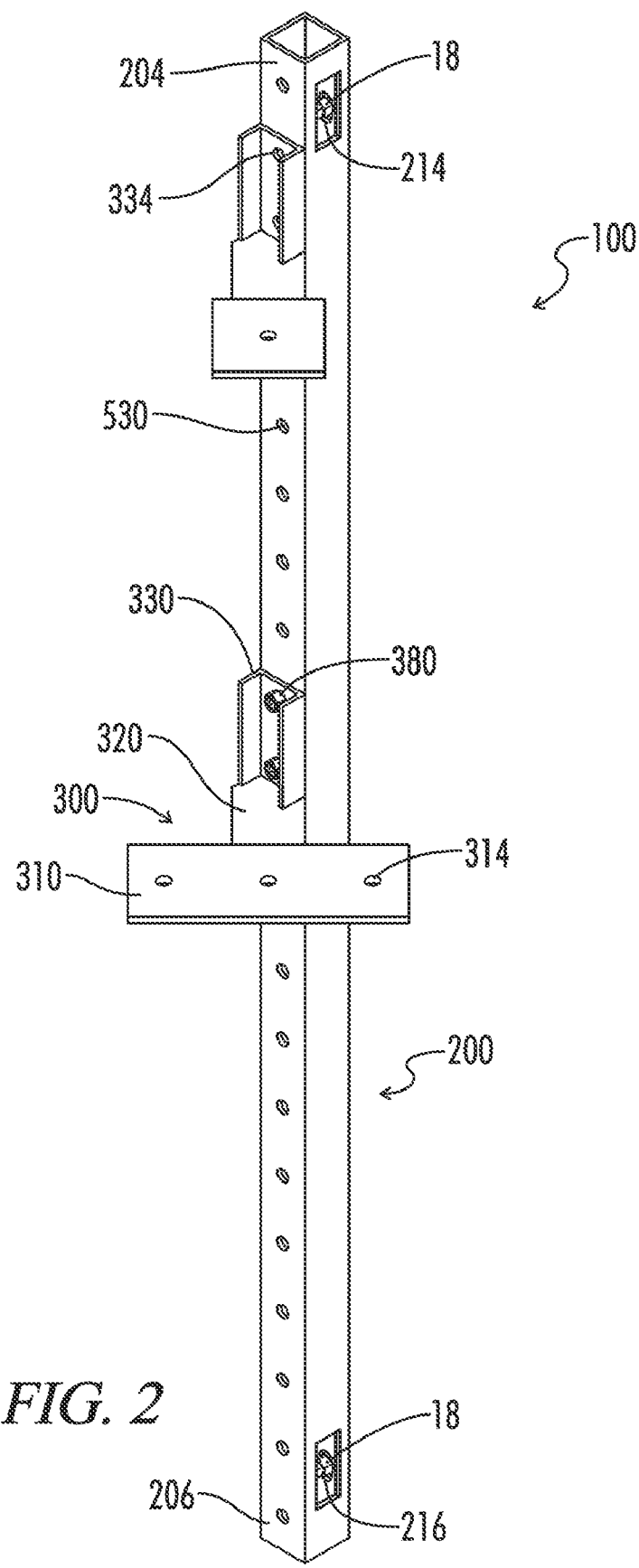
FIG. 2 is a perspective view of another embodiment of the vertical display mounting device illustrating a vertical mounting attachment member with display mounts.
Figure 3:
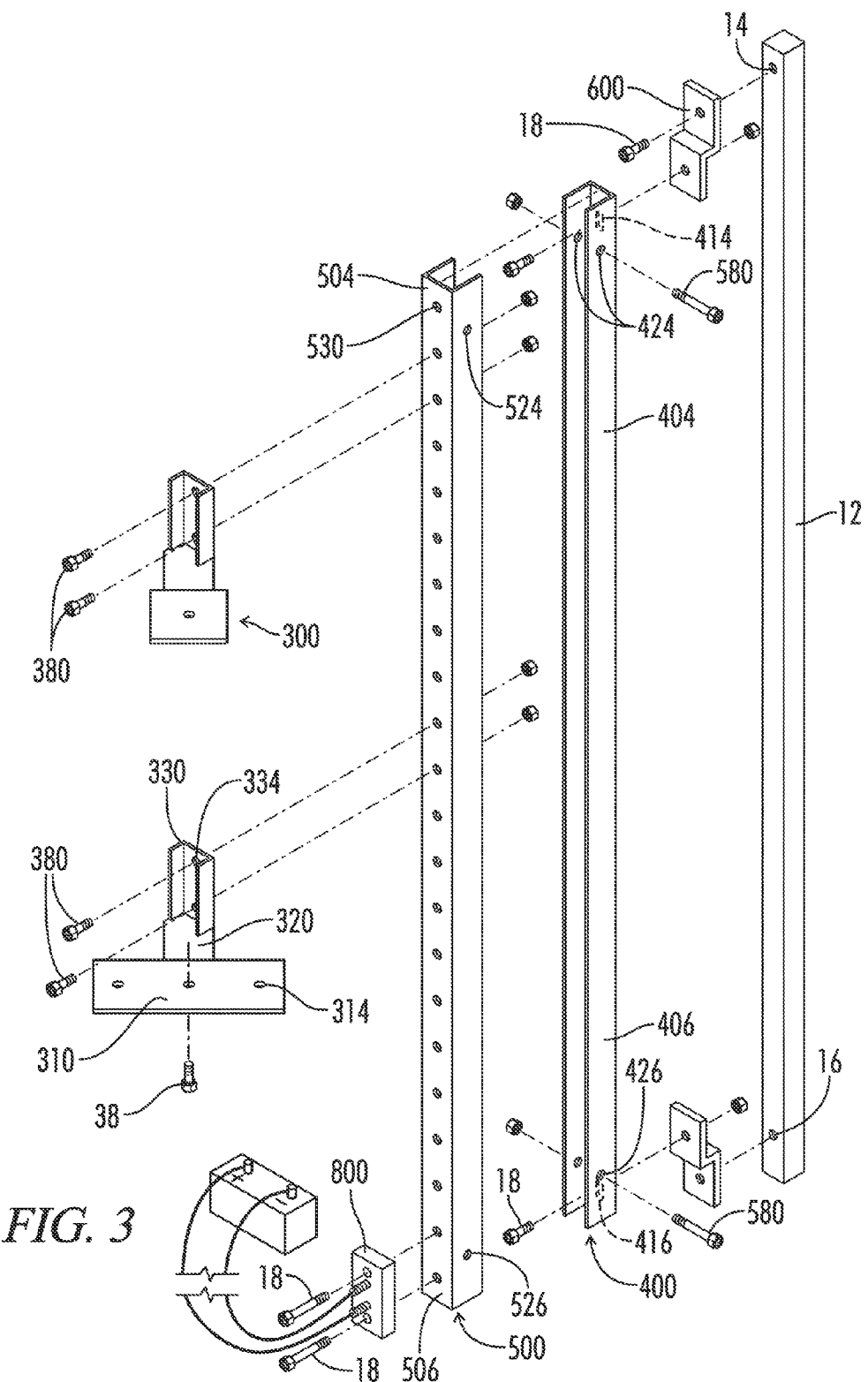
FIG. 3 depicts a exploded view of yet another embodiment of the vertical display mounting device.
Figure 5A:
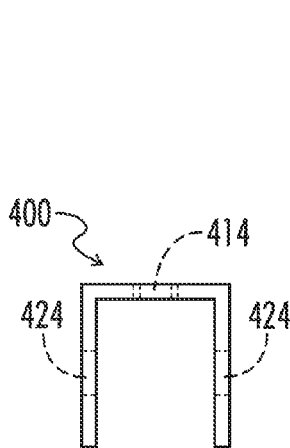
FIG. 5A is a top view of one embodiment of the vertical display mounting device vehicle mounting attachment member.
Figure 5B:
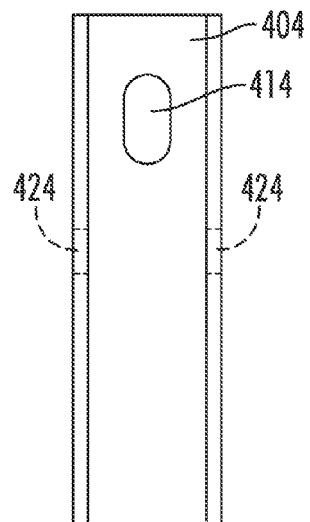
FIG. 5B is a front view of one embodiment of the vertical display mounting device vehicle mounting attachment member.
Figure 5C:
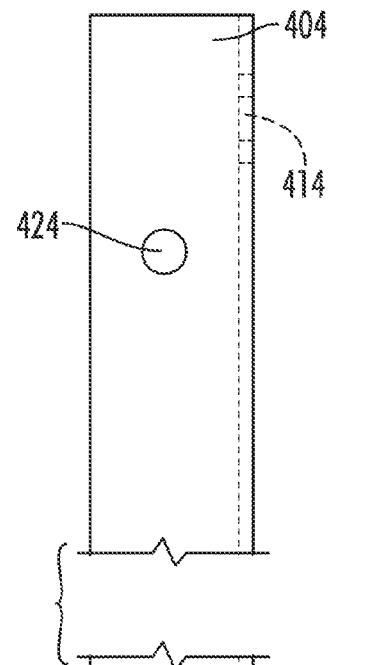
FIG. 5C is a side view of one embodiment of the vertical display mounting device vehicle mounting attachment member.
Figure 7A:
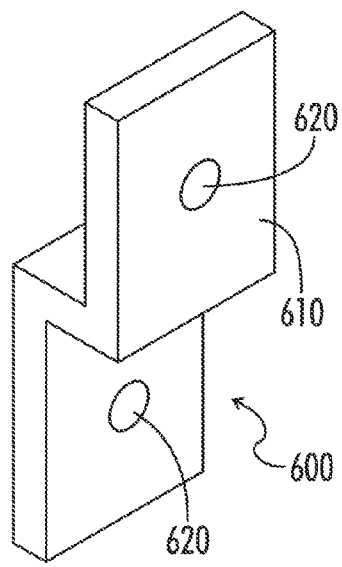
FIG. 7A is a perspective view of one embodiment of the vertical display mounting device bracket.
Figure 7C:
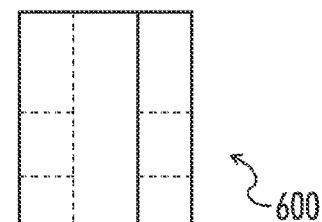
FIG. 7C is a top view of one embodiment of the vertical display mounting device bracket.
Figure 7B:
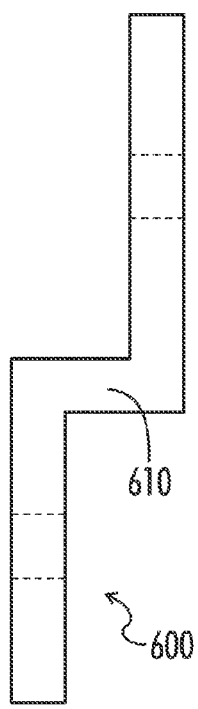
FIG. 7B is a side view of one embodiment of the vertical display mounting device bracket.
Figure 7D:
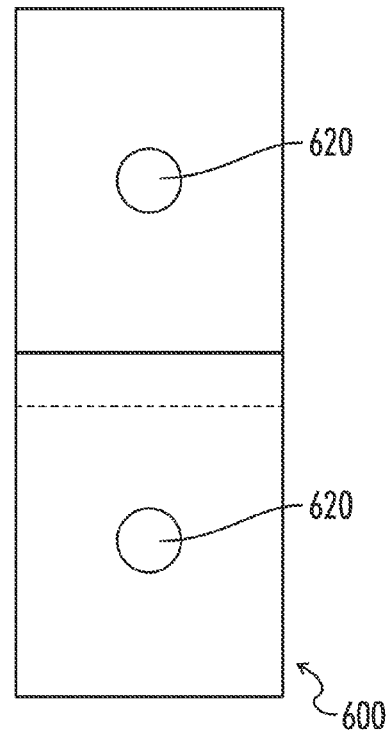
FIG. 7D is a front view of one embodiment of the vertical display mounting device bracket.
Figure 8A:
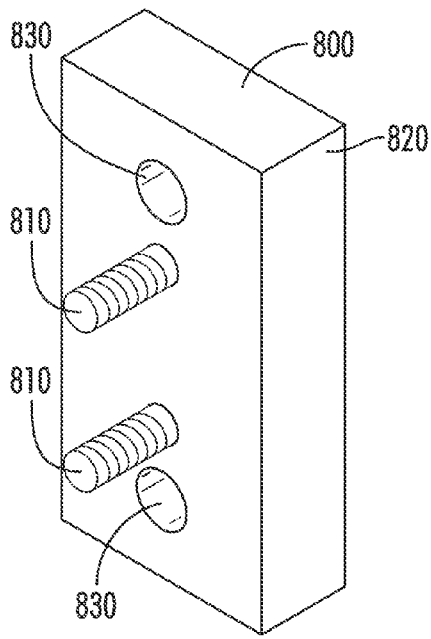
FIG. 8A is a perspective view of one embodiment of the vertical display mounting device electrical mount.
Figure 8C:
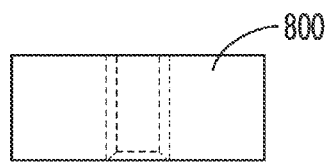
FIG. 8C is a top view of one embodiment of the vertical display mounting device electrical mount.
Figure 8B:
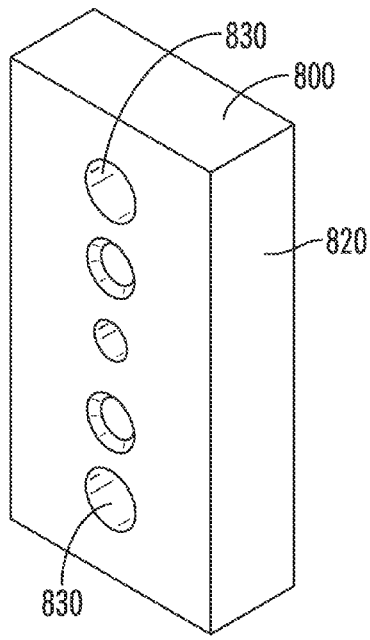
FIG. 8B is a perspective view of another embodiment of the vertical display mounting device electrical mount.
Figure 8D:
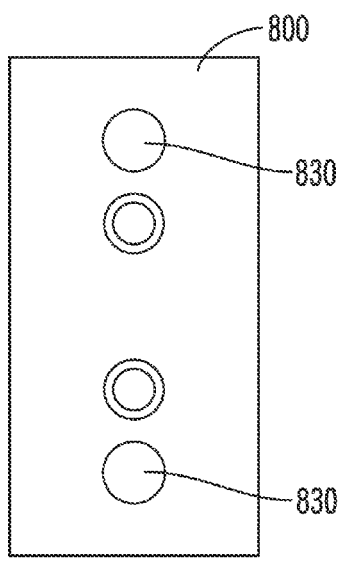
FIG. 8D is a front view of one embodiment of the vertical display mounting device electrical mount.
Figure 8E:
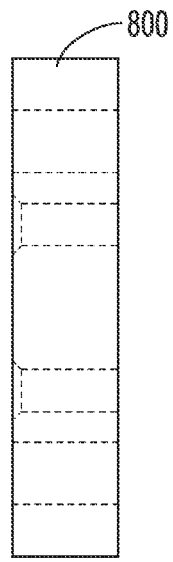
FIG. 8E is a side view of one embodiment of the vertical display mounting device electrical mount.

As illustrated in FIGS. 1 through 3, a vertical display mounting device 100 provides a simple, strong, stable mounting device with the ability to organize and conveniently mount a single monitor or display as well as multiple monitors and displays 30 in a manner that enables the operator to conveniently view and reach the monitors and displays 30 while operating a vehicle 10. One embodiment of a vertical display mounting device 100 comprises a vertical mounting attachment member 200 including an upper portion 204 of the vertical mounting attachment member 200 attachable with an upper attachment point 14 of a vehicle cab 12 and including a lower portion 206 of the vertical mounting attachment member 200 attachable with a lower attachment point 16 of the vehicle cab 12; and at least one display mount 300 wherein the at least one display mount 300 is attachable with a display 30 and the at least one display mount 300 is attachable with the vertical mounting attachment member 200. The vertical mounting attachment member 200 of one embodiment may comprise the combination of a vehicle attachment member 400 and a vertical mounting member 500.

Design Specifications:

As shown in FIGS. 1 through 3, the vertical display mounting device 100 comprises a vertical mounting attachment member 200 and at least one display mount 300 wherein the vertical mounting attachment member 200 may be the combination of a vehicle attachment member 400 and a vertical mounting member 500. The vertical mounting attachment member 200 and a vehicle attachment member 400 are mounted with the vehicle cab 12 vertically with an upper and a lower attachment point 14, 16 to provide a strong, secure attachment for vehicles such as tractors that are used ruggedly over rough terrain. An attachment using the upper portion of the member as well as the opposing lower end of the member provides more security than a floor mounted device that uses weight leveraged on one end while the attachment is on the opposing end. Thus the improved advantage of securely attaching a monitor or display as well as multiple monitors and displays at both ends of the member is utilized with the vertical display mounting device 100. The vertical display mounting device 100 may further include brackets 600 for attaching the vehicle attachment member 400 with the vehicle cab attachment points 14, 16 when a vehicle attachment aperture 214, 216 of the vertical mounting attachment member 200 or the vehicle attachment member aperture 414, 416 of vehicle attachment member 400 and the vehicle cab 12 attachment points 14, 16 are not in alignment; an electrical mount 800; and a kit embodiment.

A vertical mounting attachment member 200: As depicted in FIGS. 1 through 3, the vertical mounting attachment member 200 is a member that attaches in an approximately vertical position with a vehicle cab 12 with a vehicle 10. The vertical mounting attachment member 200 further provides a means for attachment with an at least one display mount 300 wherein a display or monitor 30 may be attached with the at least one display mount 300. One example of an attachment means of the display mount 300 with the vertical mounting attachment member 200 includes at least one display mount apertures 530 with the vertical mounting attachment 200 wherein the at least one display mount apertures 530 are vertically disposed in locations for attaching the display mount 300. The vertical mounting attachment member 200 includes an upper portion 204 and a lower portion 206. The vertical mounting attachment member 200 upper portion 204 is attachable with a vehicle cab 12 upper attachment point 14 and the vertical mounting attachment member 200 lower portion 206 is attachable with a vehicle cab 12 lower attachment point 16. An upper vehicle attachment aperture 214 is included in the upper portion 204 of the vertical mounting member 200 and a lower vehicle attachment aperture 216 is included in the lower portion 206 of the vertical mounting member 200. The vertical mounting attachment member 200 may be a one piece molded member, a section of metal square tubing, or the combination of a vehicle attachment member 400 and a vertical mounting member 500. In a preferred embodiment the vehicle attachment member 400 and the vertical mounting member 500 may be comprised of a first and second metal channel or metal U-shaped channel with apertures for mounting and joining members together. For ease of mounting with the vehicle 10 and ease of changing the configuration of the monitors and displays 30, the preferred embodiment includes both the vehicle attachment member 400 and the vertical mounting member 500 as two separate members bolted together for easy attachment and separation.

As illustrated in FIGS. 1, 3 and 5A through 5C, the vehicle attachment member 400 includes an upper portion 404 of the vehicle attachment member 400 and a lower portion 406 of the vehicle attachment member 400 wherein the upper portion 404 is attachable with a vehicle cab 12 upper attachment point 14 and the lower portion 406 of the vehicle attachment member 400 is attachable with the vehicle cab 12 lower attachment point 16. A standard attachment means may be used for attaching the vehicle attachment member 400 with the vehicle cab 12. The vehicle attachment member 400 includes an upper and lower vehicle attachment member aperture 414, 416. The upper vehicle attachment member aperture 414 may be disposed on the middle wall of a U-shaped channel aligned with the vehicle cab upper attachment point 14 and a second vehicle attachment member aperture 416 on the middle wall of an opposing end of the vehicle attachment member aligned with the vehicle cab lower attachment point 16 for attaching the vehicle attachment member 400 with the preexisting threaded apertures 14, 16 in the vehicle cab 12 of many tractors 10. Currently, a number of tractors have preexisting three-eighths inch SAE threaded apertures for receiving bolts and screws. The preferred vehicle attachment member 400 includes a metal U-shaped channel with first and second or upper and lower vehicle attachment member apertures 414, 416 on a middle wall of the U-shaped channel for mounting the vehicle attachment member 400 with the vehicle cab 12. This preferred embodiment includes aligning the upper and lower vehicle attachment member apertures 414, 416 with the preexisting vehicle cab upper and lower attachment points 14, 16 thus eliminating the need for a bracket 600 between the vehicle attachment member 400 and the vehicle cab 12 for attachment. An attachment bolt 18 may be used for mounting, or attaching and removing, the vehicle attachment member 400 on many farm tractors 10 as well as attaching and removing the bracket 600 and the electrical mount 800. One example of the attachment bolt 18 is a three-eighths inch SAE bolt. In addition, the vehicle attachment member 400 may include upper and lower vertical mounting attachment apertures 424, 426 through opposing walls of the metal channel near the upper portion 404 and the lower portion 406 of the vehicle attachment member 400 for attaching or mounting the vertical mounting member 500 with the vehicle attachment member 400.

As illustrated in FIGS. 1, 3 and 6A through 6C, the vertical mounting member 500 includes an upper portion 504 of the vertical mounting member 500 and a lower portion 506 of the vertical mounting member 500 wherein the vertical mounting member 500 is attachable with the vehicle attachment member 400. The vertical mounting member 500 includes at least one display mount aperture 530 through the vertical mounting member 500 which may be disposed through a middle wall of a second metal channel for attaching the at least one display mount 300 with the vertical mounting member 500 wherein the display mount apertures 530 are spaced vertically to align with the display brace aperture 334 at the desired display mount locations. Display mount attaching bolts 380 attach and remove the display mounts 300 with the vertical mounting member 500, and the vertical mounting member 500 further includes vehicle attachment member apertures 524, 526 through opposing walls of the second metal channel near the upper portion 504 and the lower portion 506 respectively or opposing ends of the vertical mounting member 500 for attaching the vertical mounting member 500 with the vehicle attachment member 400, and vehicle attachment-vertical mounting bolts 580 attach the vertical mounting member 500 with the vehicle attachment member 400 through the vehicle attachment member apertures 524, 526 and the vertical mounting attachment apertures 424, 426. The preferred embodiment vertical mounting member 500 includes upper and lower vehicle attachment member apertures 524, 526 and at least one display mount aperture 530 on the middle wall of a second U-shaped channel aligned with the desired locations for a display brace aperture 334. The upper and lower vehicle attachment member apertures 524, 526 include the upper vehicle attachment member aperture 524 on the upper portion 504 of the U-shaped channel on opposing walls of the U-shaped channel and a second vehicle mounting aperture 526 on the opposing walls of an opposing end or lower portion 506 of the vehicle attachment member aligned with the lower portion 406 of the vertical mounting member 500 for attaching the vehicle attachment member 400 with vertical mounting member 500 with vehicle attachment-vertical mounting bolts 580 that include three-eighths inch SAE bolts.

As depicted in FIGS. 1 through 3 and 4A through 4C, the at least one display mount 300 includes a base 310, an angled connector 320 and a display brace 330. The display base 310 is attached with the angled connector 320, and the angled connector 320 is attached with the display brace 330. The display brace 330 is attachable with the vertical mounting attachment member 200 or the vertical mounting member 500. The at least one display mount 300 is attachable with a display 30 and the at least one display mount 300 is attachable and removable with the vertical mounting attachment member 200 or the vertical mounting member 500. The at least one display mount 300 further includes at least one display attachment aperture 314 in the display base 310 for attaching the display 30 with the display mount 300 with a display mounting screw 38, and the display mount 300 further includes at least one display brace aperture 334 through the middle wall of the display brace 330 for attaching the display mount 300 with the vertical mounting member 500 such that the at least one display mount 300 will attach the display 30 with the vertical mounting member 500 with at least one display mount attaching bolt 380. The display mount 300 may be generic for a number of displays and monitors or the display mount 300 may be specifically constructed for a specific monitor or display. The base 310 may be elongated, square, or oval. The angled connector 320 may produce an offset fixed angle of between approximately 30 degree to approximately 60 degrees to produce the optimum angle for the user to view and adjust the monitors and the displays 30. The angled connector 320 is a fixed angle that is not adjustable but aids in the strength and stability of the vertical display mounting device 100. The base 310, the angled connector 320 and the display brace 330 may be constructed as a single molded member or attached as an integral member by an attachment means such as welding. The display mounting screw 38 description and specifics will be dependent upon the requirements of the display 30 being mounted. The preferred embodiment of the at least one display mount 300 is an elongated base 310 with a forty-five degree angle connector 320 and U-shaped channel display brace 330 with base 310, angle connector 320, and display brace 330 welded 350 together and the display brace apertures 334 are disposed through the middle wall of the U-shaped channel with display mount attaching bolts 380 that are three-eighths inch SAE bolts.

As illustrated in FIGS. 3 and 7A through 7D, brackets 600 may be used with the vertical display mounting device 100 when the vehicle cab 12 upper and lower attachment points 14, 16 are not aligned with vehicle attachment apertures 214, 216 of the vertical mounting attachment member 200 or the vehicle attachment member apertures 414, 416 of the vehicle attachment member 400. Wherein the bracket 600 may be included such that the vehicle attachment member 400 is attachable and removable with the bracket 600 and the bracket 600 is attachable and removable with the vehicle cab upper attachment point 14 and the vehicle cab lower attachment point 16. The bracket 600 is a means for joining the upper and lower vehicle attachment points 14, 16 with the vertical mounting attachment member 200 or the vehicle attachment member 400 when the vehicle attachment points 14, 16 and the vehicle attachment apertures 214, 216 of the vertical mounting attachment member 200 or the vehicle attachment member apertures 414, 416 of the vehicle attachment member 400 are not aligned. The bracket 600 may include a simple, sturdy metal strip 610 that is approximately vertical then offset horizontally and then approximately vertical again with a bracket aperture 620 disposed in each of the vertical sections such that the bracket 600 allows the vertical mounting attachment member 200 to be aligned with, and attachable, with the vehicle cab 12 upper attachment point 14 and the vehicle cab 12 lower attachment point 16 and using attachment bolts 18 as a means for attaching the bracket 600 with the vehicle cab 12 upper and lower attachment points 14,

16 and the vertical mounting attachment member 200 or the vehicle attachment member 400.

As shown in FIGS. 1, 3 and 8A through 8E, An electrical mount 800 comprising an electrical connection 810 for electrically connecting the electrical wires from the monitors and displays 30 with the battery or electrical power of the vehicle 10 wherein the electrical connection may be attached with but electrically isolated by a non-electrical conductive material with a vertical mounting attachment member 200 or the vertical display mounting device 100. An electrical mount 800 may be mounted on the vertical mounting attachment member 200 or the vertical display mounting device 500 wherein the electrical mount 800 includes an electrical connection 810. In one embodiment a means for mounting may include a non-electrical conductive material 820 attached with the vertical display mounting device 100 wherein an electrical connection post 810 is attached with the electrical mount 800 and the electrical connection post 810 is the means for connecting the electrical wires and the electrical post is attached with the wires from the monitors and displays 30 with the wires from the battery to form an electrical connection between the monitors and displays 30 and the electrical power source. The preferred embodiment would include two electrical connections 810 with one electrical connection 810 for the positive electrical connections and one electrical connection 810 for the negative connections further including electrical mount apertures 830 for connecting the electrical mount 800 with the vertical mounting attachment member 200 or vertical mounting member 500 and using attachment bolts 18 as a means for attaching the electrical mount 800 with the vertical display mounting device 100 through the at least one display mount apertures 530.

As illustrated in FIGS. 1 through 3, a kit may be one embodiment of a vertical display mounting device 100. The vertical display mounting device 100 may further include in combination: display mounting screws 38 for attaching the display 30 with the display mount 300, display mount attaching bolts 380 for attaching the display mount 300 with the vertical mounting member 500; vehicle attachment-vertical mounting bolts 580 for attaching the vertical mounting member 500 with the vehicle attachment member 400; an electrical mount 800; attachment bolts 18 as a means for attaching the electrical mount 800 with the vertical display mounting device 100 through the display mount apertures 530 and attachment bolts 18 for attaching the vehicle 12 upper and lower attachment points 14, 16 and the vertical mounting attachment member 200 or the vehicle attachment member 400; and electrical wire for attaching the electrical mount with a battery.

What is claimed is:

1. A vertical display mounting device comprising:
    a vertical mounting attachment member including an upper portion of the vertical mounting attachment member attachable with a vehicle cab upper attachment point, and a lower portion of the vertical mounting attachment member attachable with a vehicle cab lower attachment point, and a display mount aperture through the vertical mounting attachment member; and
    at least one display mount wherein the at least one display mount is attachable with a display and the at least one display mount is attachable with the vertical mounting attachment member and the at least one display mount includes a base, an angled connector and a display brace wherein the display mount includes a display brace aperture through the display brace for attaching the display mount with the vertical mounting attachment member, wherein the angled connector includes a substantially horizontal offset fixed angle between 30 degrees and 60 degrees in the horizontal plane for producing an optimum angle for a user to view and adjust the display settings, wherein the base is attached with the angled connector and the angled connector is attached with the display brace and the display brace is attachable with the vertical mounting attachment member with a display mount attaching bolt.

2. The vertical display mounting device as set forth in claim 1 wherein the vertical mounting attachment member comprises a vehicle attachment member and a vertical mounting member:
    wherein the vehicle attachment member includes the upper portion of the vertical mounting attachment member and the lower portion of the vertical mounting attachment member wherein the upper portion and the lower portion of the vehicle attachment member are attachable with the vehicle cab upper attachment point and the vehicle cab lower attachment point;
    wherein the vertical mounting member is attachable with the vehicle attachment member; and
    wherein the vertical mounting member is attachable with the at least one display mount.

3. The vertical display mounting device as set forth in claim 2 further comprising an electrical mount mounted on the vertical mounting attachment member wherein the electrical mount includes an electrical connection.

4. A vertical display mounting device comprising:
    a vehicle attachment member comprising a metal U-shaped channel wherein the vehicle attachment member includes an upper portion wherein the upper portion of the vehicle attachment member is attachable with a vehicle cab upper attachment point, and a lower portion wherein the lower portion of the vehicle attachment member is attachable with a vehicle cab lower attachment point;
    a vertical mounting member comprising a second metal U-shaped channel wherein the vertical mounting member is attachable with the vehicle attachment member; and
    at least one display mount wherein the at least one display mount is attachable with a display and the at least one display mount is attachable with the vertical mounting member and the at least one display mount includes an elongated base, an angled connector and a display brace wherein the elongated display base is attached with the angled connector, and the angled connector is attached with the display brace and the display brace is attachable with the vertical mounting member.

5. The vertical display mounting device as set forth in claim 4 wherein:
    the vehicle attachment member includes an upper vehicle attachment member aperture on a middle wall of the metal U-shaped channel in an approximate area of the upper portion of the vehicle attachment member aligned with the vehicle cab upper attachment point, and a lower vehicle attachment member aperture on the middle wall of the metal U-shaped channel in the approximate area of the lower portion of the vehicle attachment member aligned with the vehicle cab lower attachment point, and vehicle attachment bolts wherein the vehicle attachment bolts are used for attaching and removing the vehicle attachment member with the vehicle cab; and wherein the vehicle attachment member further includes vertical mounting attachment apertures through opposing walls of the metal U-shaped channel near the upper and lower portions of opposing ends of the vehicle attachment member for mounting the vertical mounting member with the vehicle attachment member;

the vertical mounting member includes at least one display mount aperture through a middle wall of the second metal U-shaped channel for attaching the display mount with the vertical mounting member wherein the display mount apertures are spaced apart vertically to align with the desired display mount locations, and the vertical mounting member further includes vehicle attachment member apertures through opposing walls of the second metal U-shaped channel near the upper and lower portions of the vertical mounting member for attaching the vertical mounting member with the vehicle attachment member, wherein vehicle attachment-vertical mounting bolts attach the vertical mounting member with the vehicle attachment member through the vehicle attachment apertures and the vertical mounting attachment apertures; and the at least one display mount further includes at least one display attachment aperture in the elongated display base for attaching the display with the display mount, and the display mount further includes at least one display brace aperture through the middle wall of the display brace for attaching the display mount with the vertical mounting member such that the at least one display mount attach the display with the vertical mounting member with at least one display mount attaching bolt, wherein the display mount attaching bolts attach and remove the display mount with the vertical mounting member.

6. The vertical display mounting device as set forth in claim 5 further including a bracket such that the vehicle attachment member is attachable with the bracket and the bracket is attachable with the vehicle cab upper attachment point and the vehicle cab lower attachment point.

7. The vertical display mounting device as set forth in claim 6 further including an electrical mount mounted on the vertical display mounting device wherein the electrical mount includes an electrical connection.

8. The vertical display mounting device as set forth in claim 7 in combination with screws for attaching the display with the display mount, display mount attaching bolts for attaching the display mount with the vertical mounting member, vehicle attachment-vertical mounting bolts for attaching the vertical mounting member with the vehicle attachment member, attachment bolts for attaching the vehicle upper and lower attachment points and the vehicle attachment member, attachment bolts for attaching the electrical mount with the vertical display mounting device through the display mount apertures, and electrical wire for attaching the electrical mount with a battery.

* * * * *